(12) United States Patent
Priestley

(10) Patent No.: US 6,765,671 B2
(45) Date of Patent: Jul. 20, 2004

(54) AUTOMATED SYSTEM FOR MEASUREMENT OF AN OPTICAL PROPERTY

(75) Inventor: Richard S. Priestley, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 95 days.

(21) Appl. No.: 10/149,693
(22) PCT Filed: Dec. 1, 2000
(86) PCT No.: PCT/US00/32768
§ 371 (c)(1), (2), (4) Date: Nov. 18, 2002
(87) PCT Pub. No.: WO01/42769
PCT Pub. Date: Jun. 14, 2001

(65) Prior Publication Data
US 2003/0227622 A1 Dec. 11, 2003

Related U.S. Application Data
(60) Provisional application No. 60/204,405, filed on May 16, 2000.

(51) Int. Cl.[7] ............................. G01J 4/00; G01B 11/28
(52) U.S. Cl. ....................................... 356/365; 356/634
(58) Field of Search ................................. 356/365, 634; 250/559.24, 559.26, 559.27, 559.28, 559.29

(56) References Cited

U.S. PATENT DOCUMENTS

| | | | |
|---|---|---|---|
| 3,811,775 A | 5/1974 | Abu-Saud | |
| 4,626,100 A | 12/1986 | Johnson | |
| 5,028,774 A | 7/1991 | Yoshizawa et al. | |

*Primary Examiner*—Zandra V. Smith
(74) *Attorney, Agent, or Firm*—Timothy M. Schaeberle; James V. Suggs

(57) ABSTRACT

A method for automating measurement of an optical property of a sample includes selecting a measurement aperture around a reference point on the sample (38), generating a set of grid nodes that fall within the measurement aperture (68), calculating the radial distance of each node with respect to a reference point within the measurement aperture, and calculating the angular position of each node with respect to the vertical. The method also includes moving a light source (32) and a light detector along the vertical and rotating the sample to measurement positions in which the light source and the light detector are aligned with one of the nodes in the measurement aperture, and measuring the optical property at the measurement position by energizing the light source and interrogating the detector. The calculated radial distances and angular positions are used to control positioning of the light source and the light detector and rotation of the sample.

17 Claims, 8 Drawing Sheets

AUTOMATED SYSTEM FOR MEASUREMENT OF AN OPTICAL PROPERTY

CROSS-REFERENCE TO RELATED APPLICATION

This application claims the benefit of priority of U.S. application Ser. No. 09/458,561, filed Dec. 9, 1999, entitled Automated System For Measurement Of An Optical Property, of Richard S. Priestley and U.S. Provisional Application Serial No. 60/204,405, filed May 16, 2000, entitled Automated System For Measurement Of An Optical Property, of Richard S. Priestley, which is hereby incorporated by reference.

BACKGROUND OF THE INVENTION

1. Technical Field

The invention relates generally to systems for measuring birefringence or other optical property, e.g., transmission, of a sample of material.

2. Background Art

Birefringence, or double refraction, is a phenomenon that occurs in materials characterized by two indices of refraction. Typically, birefringent materials are optically anisotropic substances, e.g., calcite and quartz, although some isotropic materials such as glass and plastic become birefringent when subjected to stress. When a beam of light enters a birefringent material, the beam splits into two polarized rays each traveling at a different velocity, corresponding to a different index of refraction. One ray, called an ordinary ray, is characterized by an index of refraction that is the same in all directions. The second ray, called an extraordinary ray, travels with different speeds in different directions and hence is characterized by an index of refraction that varies with the direction of propagation. If the light entering the birefringent material is unpolarized or linearly polarized, the ordinary and extraordinary rays will have the same velocity along one direction, called the optic axis. The ordinary and extraordinary rays recombine upon exiting the material.

Birefringent materials can change the polarization state of a light passing through them. Therefore, the ability to accurately determine the birefringence of a sample is important, especial y in high performance optics, e.g., ophthalmic lenses, laser optics, and optical fiber, where a change in the polarization state of light can cause dramatic changes in optical performance. When linearly polarized light passes through a birefringent sample, the sample rotates the direction of polarization through some angle. By measuring this angle of rotation, the birefringence of the sample, i.e., the difference between the highest and lowest indices of refraction of the sample, can be determined. Typically, the sample is placed between two crossed linear polarizers. The birefringence at a given point about the cross section of the sample is then determined by measuring the angular position, with respect to the first linear polarizer, at which the light emerging from the sample is extinguished as it passes through the second linear polarizer.

Various other methods are known for determining birefringence. One example of a known method is disclosed in U.S. Pat. No. 5,257,092 issued to Noguchi el al. As shown in FIG. 1, an optical source unit 2 emits a linearly polarized light beam, which passes through a quarter-wave plate 4. The quarter-wave plate 4 converts the beam emitted by the optical source 2 to circularly polarized light, which then passes through the birefringent sample 6, where the light emerges elliptically polarized. This emergent light then passes through a second quarter-wave plate 8 which converts the light to near-linear polarized light. The light then passes through a rotatable analyzer 10. Birefringence is determined by measuring the angle of the analyzer 10 with respect to the source 2 at which light is extinguished. The method disclosed by the Noguchi et ail. '092 patent uses circularly polarized light rather than linearly polarized light because, in the samples used, birefringence had to be measured in all directions. If linearly polarized light is used, there inherently will be a direction in which no birefringence occurs, i.e., the optic axis.

Another example of a method for measuring birefringence is disclosed in U.S. Pat. No. 5,587,793 issued to Nakai el al. As illustrated in FIG. 2, a sample 12 is placed between a circular polarizer 14 and a circular analyzer 16 and arranged in an optical path between a light source 18 and an optical receiver 20. The circular polarizer 14 is a combination of a polarizer 22 and a quarter-wave plate 24, and the circular analyzer 16 is a combination of a quarter-wave plate 26 and an analyzer 28. The circular analyzer 16 is arranged in a crossed Nicols fashion with respect to the circular polarizer 14. A crossed Nicols fashion refers to the arrangement of the polarizers such that their polarization axes are set 90 degrees from one another. In this method, monochromatic parallel beams emitted from the light source 18 are converted into circularly polarized light by the circular polarizer 22 and projected onto sample 12. The light beams then pass through the circular analyzer 16 to be detected by the optical receiver 20.

The birefringence of the sample may vary from location to location across the sample. Thus, in order to describe the birefringence of a sample, birefringence at a number of points along or distributed on the surface of the sample is measured. One procedure used in industry includes taking a measurement at one position on the cross section of a sample and then manually moving the sample e.g., by using a lab jack, so that the measurement is made at another test point on the cross section. The measurements are repeated at numerous test points about the cross section of the sample to generate a birefringence map. Because mapping requires a large number of points, mapping the sample manually is a difficult and time-consuming task. In some cases, the actual birefringence measurement is also performed manually, with the operator having to determine the actual angle of light extinction. Therefore, the accuracy of these measurements can vary from operator to operator.

SUMMARY OF THE INVENTION

The invention is a method for automating measurement of an optical property of a sample. The method comprises selecting a measurement aperture around a reference point on the sample, generating a set of grid nodes that fall within measurement aperture, calculating the radial distance of each node with respect to a reference point within the measurement aperture, and calculating the angular position of each node with respect to the vertical. The method further includes calculating the angular position of each node with respect to the vertical and moving a light source and a light detector along the vertical and rotating the sample to measurement positions within the measurement aperture. The calculated radial distances and angular positions are used to control positioning of the light source and the light detector and rotation of the sample. The optical property is measured at the measurement position by energizing the light source and interrogating the detector.

DETAILED DESCRIPTION OF THE INVENTION

Figure 1:
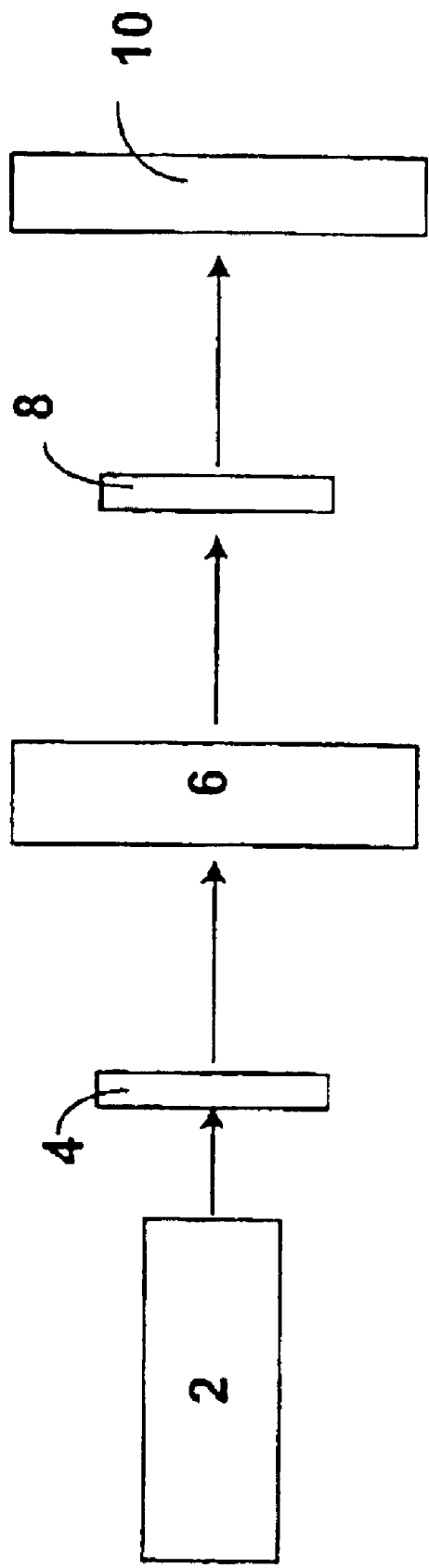
FIG. 1 shows a prior art system for determining birefringence of a material.
Figure 2:
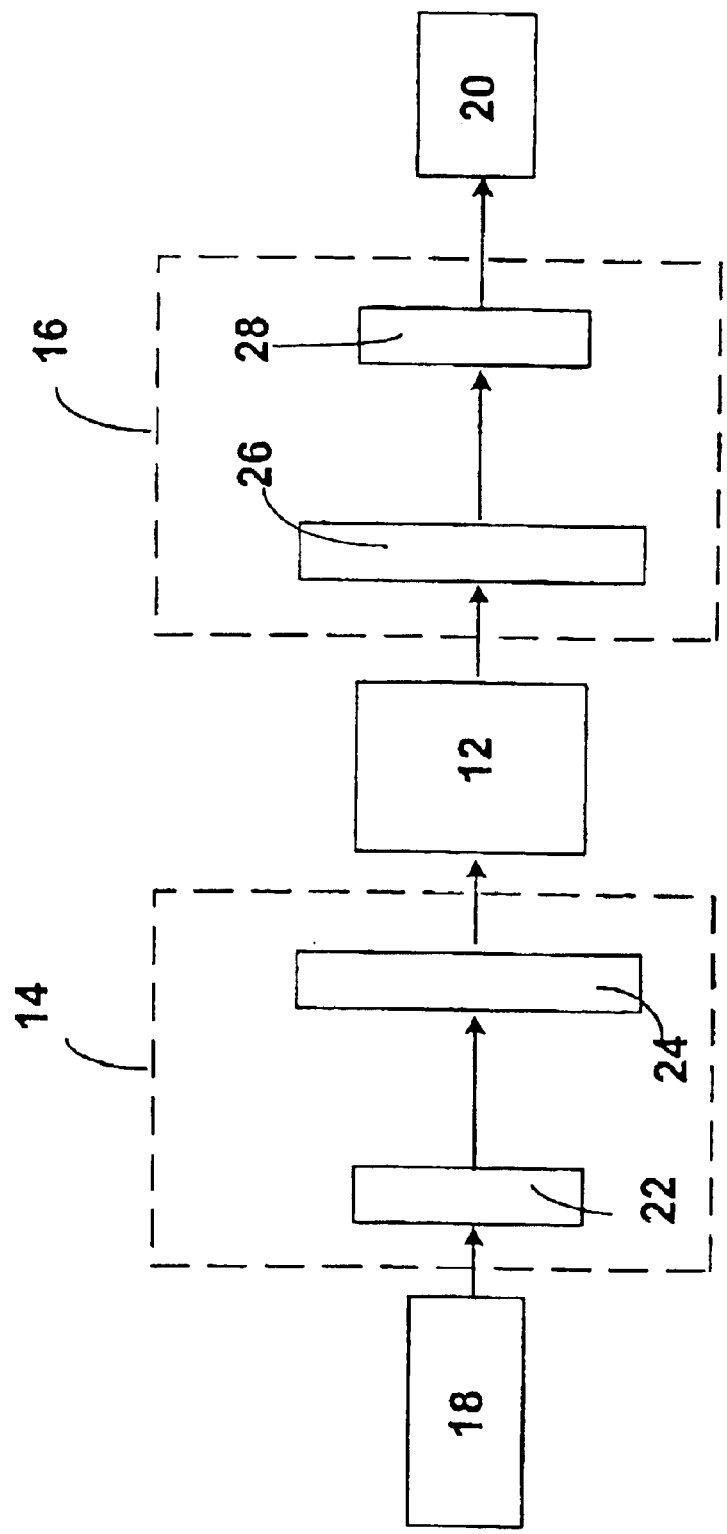
FIG. 2 shows another prior art system for determining birefringence of a material.
Figure 3:
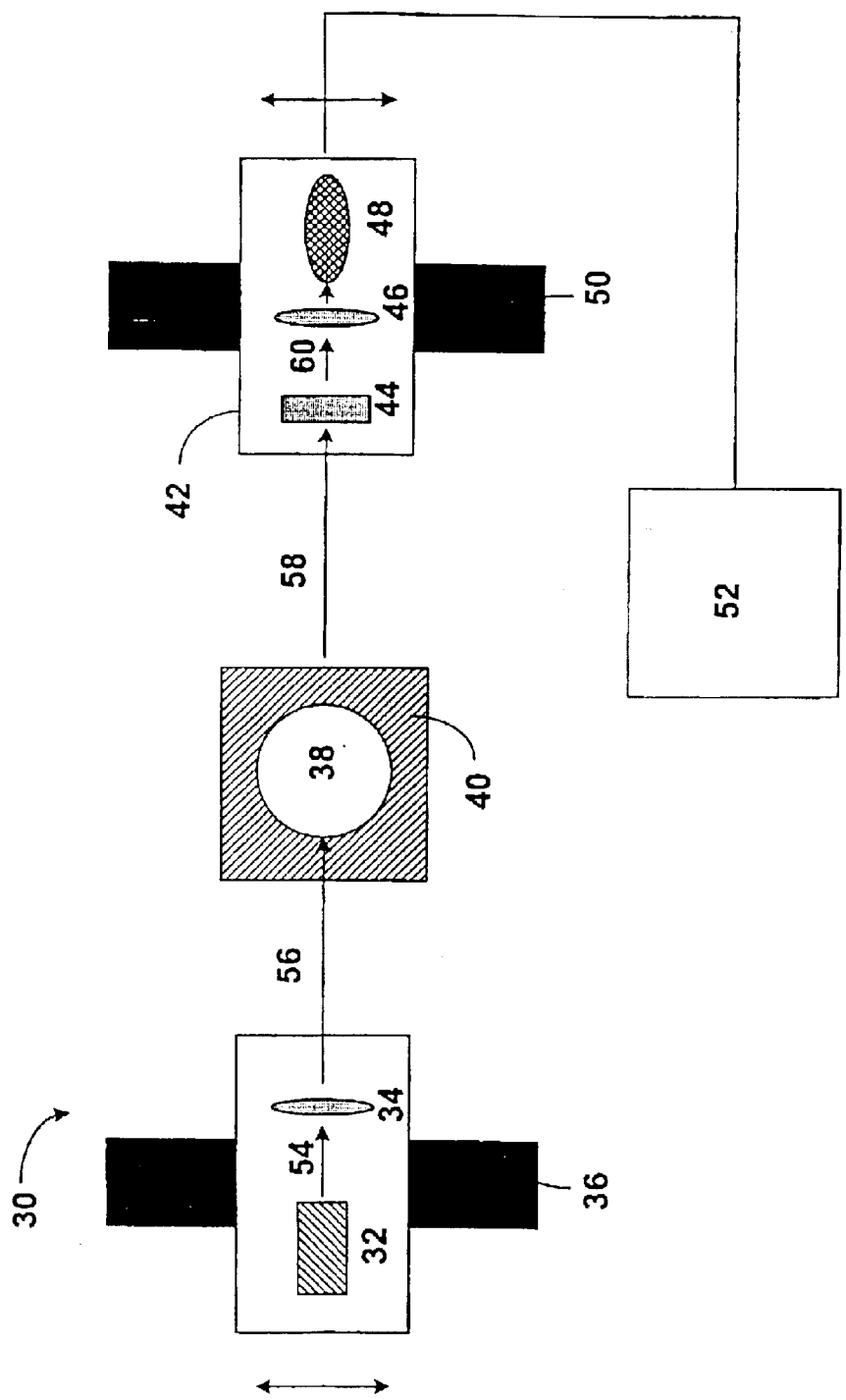
FIG. 3 is a schematic of an automated system for measuring an optical property.

FIG. 3 illustrates an automated system 30 for measuring an optical property, e.g. birefringence, across a sample. The automated system 30 includes a light source unit 32 and a first polarizer 34. The first polarizer 34 may be one made by Corning Inc., sold under the trade name Polarco®. This type of polarizer creates linear polarized light and has a higher light extinction ratio ($<10^{-5}$) than commonly used sheet polarizers, which have extinction ratios of about $10^{-4}$. However, the invention is not limited to this type of polarizer. Sheet polarizer or other types of polarizers, e.g., calcite polarizers, can also be used. The light source unit 32 and the first polarizer 34 are mounted on a vertically movable first translational stage 36. The first translational stage 36 preferably has the ability to accurately move as little as 1 micron. Translational stages which can be used with the automated system 30 are commercially available and can be purchased, for example, from Newport Company (model # MTMCC1).

The automated system 30 further includes a detector end 42. The detector end 42 comprises a quarter-wave plate 44, a second polarizer or analyzer 46 oriented in a crossed Nicols fashion with respect to the first polarizer 34, and a photomultiplier 48. The second polarizer or analyzer 46 may be one made by Corning Inc., sold under the trade name Polarcor®, or may be other type of polarizer. The wave plate 44 is not limited to quarter-wave plates, but may be a half-wave plate, for example. The detector end 42 is mounted on a second translational stage 50. The second translational stage 50 can move simultaneously with the first translational stage 36, while keeping the light source unit 32 and the detector end 42 optically aligned. The translational stages 36 and 50 may also move independently of one another along a selected line. The analyzer 46 is mounted in a rotation stage (not shown) which is also mounted on the second translational stage 50. The rotation stage has the ability to rotate the analyzer 46 such that the angular position of light extinction can be measured.

The automated system 30 also includes a sample holder 40. In the illustrated embodiment, the sample holder 40 is rotatable and comprises a series of plates with rings (not shown) for holding a sample of a selected shape, e.g., sample 38. The sample holder 40 further comprises a controllable means (not shown) for rotating the sample 38. Preferably, the sample holder 40 has the ability to rotate the sample 38 around a full circle. In the illustrated embodiment, the sample 38 is a birefringent lens blank which has parallel surfaces. It should be understood that the sample 38 can be any shape or material of a birefringent nature, as long as it can be placed physically in the sample holder 40 and can be rotated.

In operation, a light beam 54 from the light source unit 32 enters the polarizer 34. The light beam in this embodiment is a He-Ne laser beam with a wavelength of 632.8 nanometers, but may be any other type of light beam. A planar polarized light 56 emerges from the first polarizer 34 and enters the sample 38. Because of the birefringent nature of the sample 38, when the planar polarized light 56 enters the sample 38, it splits into two light rays (not shown). The two light rays (not shown) recombine into an elliptically polarized light 58 upon exiting from the sample 38. The elliptical polarization of the light 58 is caused by the phase difference between the two light rays. The elliptically polarized light 58 then enters the quarter-wave plate 44, where it is converted into a linearly or nearly linearly polarized ray 60. This ray 60 enters the analyzer 46, which is arranged in a crossed Nicols fashion with respect to the first polarizer 34. The light beam emerging from the analyzer 46 then enters a photomultiplier 48, which measures the light intensity.

The birefringence at a particular point in the sample 38 can be determined by measuring the angular position at which the light is extinguished as it passes through the polarizers 34 and 46. The angular position at which the light is extinguished is obtained by rotating the second polarizer or analyzer 46 with respect to the first linear polarizer 34 until the light intensity measured by the photomultiplier 48 diminishes to some minimum value or to zero. The measurements can be stored on an electromagnetic medium (not shown) and subsequently or simultaneously analyzed. Before measurements are taken, a computer 52 sends command signals to the translational stages 36 and 50 and sample holder 40 to align the point on the sample 38 with the light source unit 32 and the light detector end 42. A series of data points can be taken along a vertical line through the sample 38 by moving the translation stages 36 and 50 vertically and measuring the angular position at which the light passing through the polarizers 34 and 46 is extinguished. Additional data points can be obtained by rotating the sample 38 through a predetermined angle and, thereafter, moving the translation stages 36 and 50 vertically to take measurements along a vertical line through the sample 38.

Figure 4:
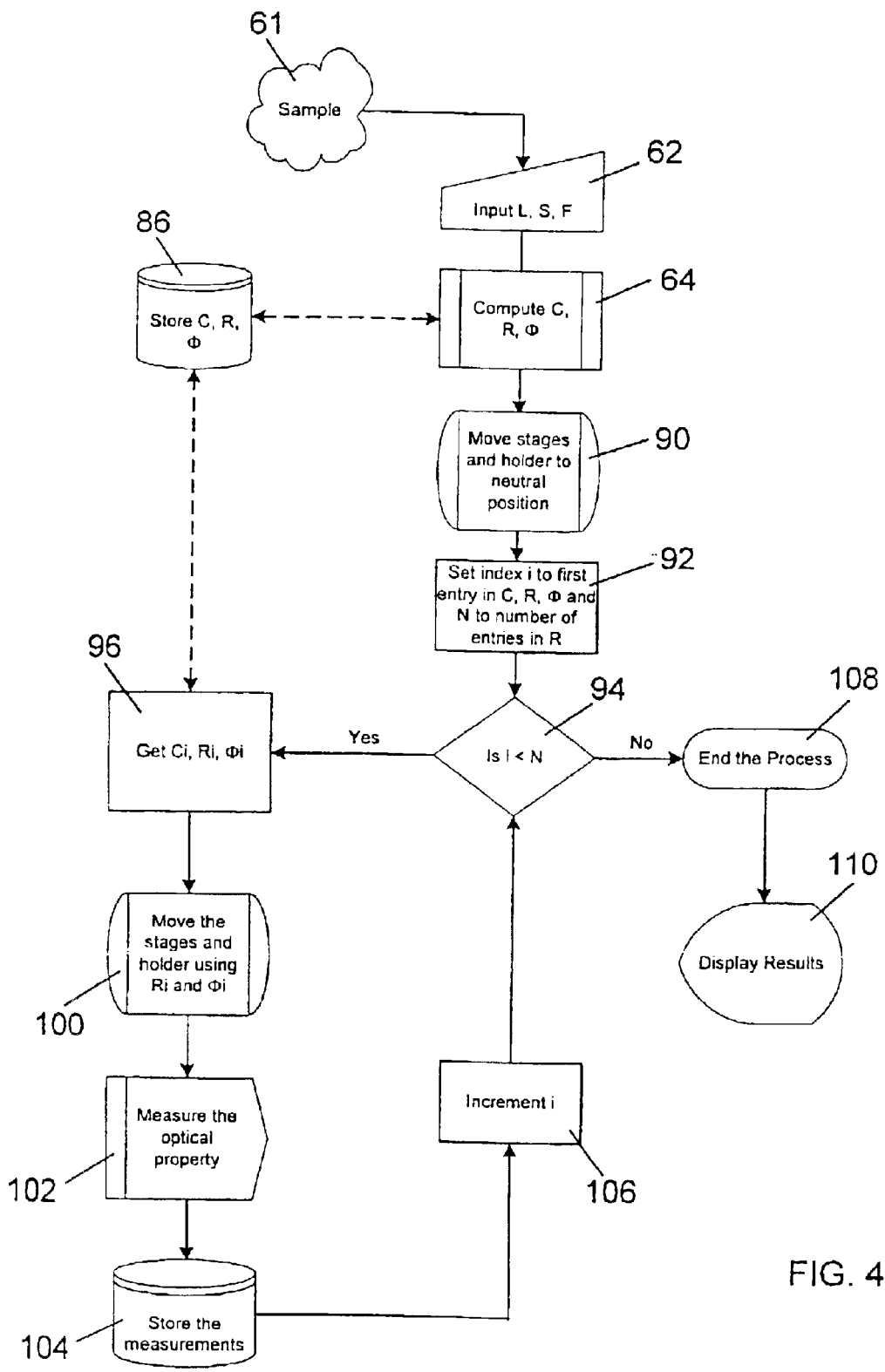
FIG. 4 is a block diagram of a process for measuring an optical property using the system shown in FIG. 3.

FIG. 4 illustrates the process for automatically creating a birefringence map for a sample 61. This process can be implemented using LabVIEW, a computer-based measurement and automation tool produced by National Instruments, or any other suitable data flow tool. The process starts with an input module 62 that prompts a user for information about the geometry of the sample 61. The input module 62 would typically be a graphical user interface with one or more input boxes for receiving information from the user. By default, the input module 62 prompts the user for a length L of the sample 61. The length L of the sample 61 depends on the shape of the sample. For a circularly-shaped sample, the length L is the diameter of the sample. For a quadrilateral sample, the length L is the smaller of the height and width of the sample. For other shapes, the length L can be the diameter of a circle that can be inscribed within the boundary of the sample. The input module 62 may also prompt the user for two lengths, e.g., height and width of the sample 61, instead of one length or may accept a stream of data that defines the boundary of the sample.

In addition to prompting the user for information about the geometry of the sample 61, the input module 62 prompts the user for the desired spacing S between data points on the birefringence map and for a number F that will be used to determine the fraction of the cross sectional area of the sample to be mapped. The number F would have a value greater than 0 and less than or equal to 1. If the number F is 1, the entire cross section of the sample 61, as specified by the geometric information supplied by the user, will be mapped. If the number F is less than 1, the boundary of the sample 61 and a portion of the sample 61 along the boundary will not be mapped. The portion of the sample 61 that will be mapped is measured in this embodiment from the geometric center of the sample. The input module 62 may also prompt the user for other parameters related to the measurement of birefringence, e.g., the thickness of the sample 61. Because the process can be used to automatically measure optical properties other than birefringence, the input module 62 will generally be adapted to prompt the user for parameters related to the particular optical property being measured.

Figure 5:
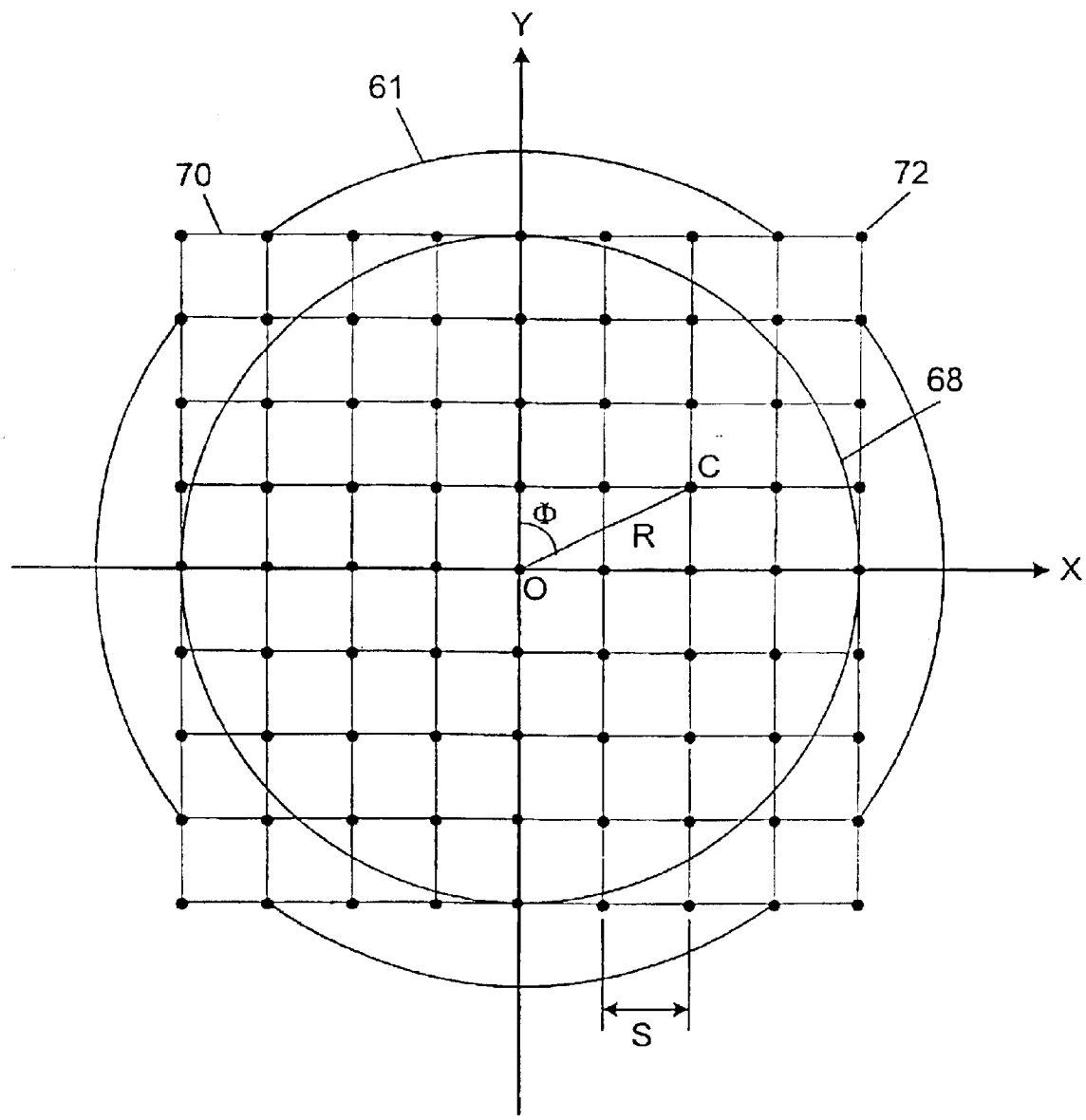
FIG. 5 shows how data points are sampled using the process described in FIG. 4.

The process continues with a grid generation module 64. FIG. 5 illustrates graphically the functions of the grid generation module 64, which are to (1) determine the dimensions of a measurement aperture 68 of the sample and (2) create a grid 70 with nodes 72 that correspond to points within the measurement aperture 68 at which the optical property birefringence in this embodiment will be measured. The dimensions of the measurement aperture 68 are determined from the user-supplied geometric information for the sample 61. Basically, the output of the grid generation module 64 is a matrix C and vectors R and Φ. The matrix C contains coordinates of the nodes 72 in a Cartesian coordinate system that has its origin O coincident with the center of rotation of the sample 61. In FIG. 5, the center of rotation of the sample 61 is assumed to be coincident with the geometric center of the sample 61. The vector R contains radial distances of the coordinates C from the origin O. The vector Φ contains the angles through which coordinates C must be rotated to become aligned with the Y-axis (vertical).

Figure 6:
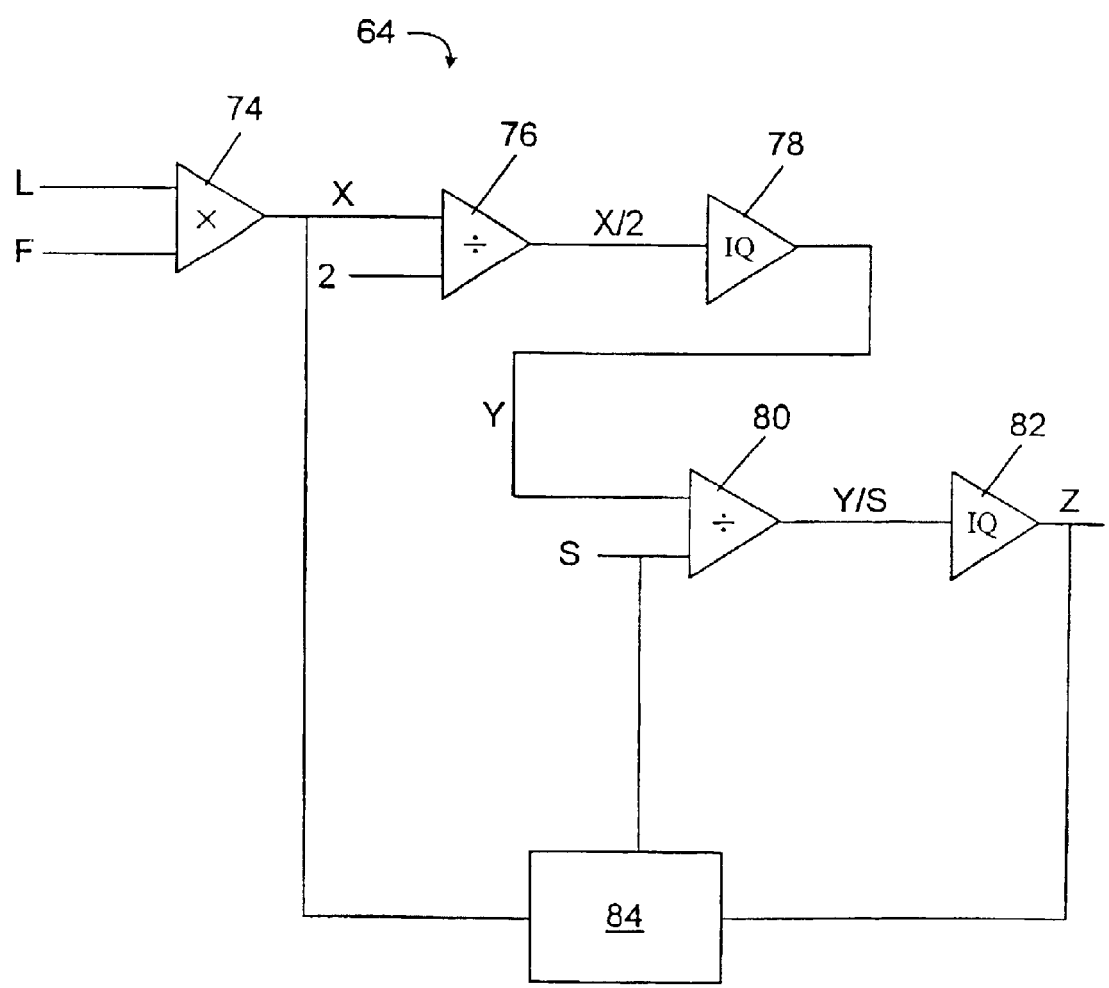
FIG. 6 is a schematic illustration of a process used to generate nodes.

The operations of the grid generation module 64 are illustrated for the circular sample, e.g., a circular lens blank, shown in FIG. 5. However, the grid generation module 64 can be readily adapted to other non-circular shapes such as a quadrilateral. As illustrated in FIG. 6, the grid generation module 64 starts by multiplying the user-supplied length L of the sample 61 by the number F, shown at 74, to obtain the length X. As previously discussed, the length L for a circular sample is the diameter of the sample. The length X corresponds to the diameter of the measurement aperture 68 (shown in FIG. 5). The length X is divided by two, shown at 76, and the integer quotient of the result is taken, shown at 78, to obtain a length Y. The length Y corresponds to the radius of the measurement aperture 68. It should be noted that the length Y may not be exactly equal to half of the length X because the integer quotient operation involves rounding off to whole numbers. The length Y is then divided by the user-supplied spacing S, shown at 80, and the integer quotient of the result is taken, shown at 82, to obtain the number Z of data points to be measured along the length Y.

Assuming that the length Y is superimposed on the positive X-axis of the coordinate system shown in FIG. 5, then the coordinates (x,y) of the Z data points or nodes along the positive X-axis would be:

$$(x,y)=\{(S,0), (2S,0), (3S,0), \ldots, ((Z-1)S,0)), (ZS,0)\} \quad (1)$$

If the length Y is superimposed on the negative X-axis of the coordinate system, then the coordinates of the Z data points measured along the length Y would be:

$$(x,y)=\{(-ZS,0), (-(Z-1)S, \ldots, (-3S,0), (-2S,0), (-S,0)\} \quad (2)$$

Taking into account the origin O of the coordinate system and the edges $E_1$ and $E_2$ of the measurement aperture 68, the coordinates of the nodes 72 in the grid 70 can then be computed, shown at 84, using the following expression:

$$(x,y)=\{(-X/2,y), (-ZS,y), (-(Z-1),y), \ldots, (-2S,y), (-S,y), (0,y), (-S,y), (-2S,y), \ldots, ((Z-1),y) (ZS,y), (X/2,y)\}$$

where $$y=\{-X/2, -ZS, -(Z-1)S, \ldots, -2S, -S, 0, S, 2S, \ldots, (Z-1)S, ZS, X/2\} \quad (3)$$

The expression (3) will be evaluated for every value of y to obtain the coordinates of the nodes 72 in the grid 70. The size of the grid 70 is (2Z+3) by (2Z+3). A non-square grid can be generated if two unequal lengths $L_1$ and $L_2$ are supplied to the input module 62. In which case, two lengths $Y_1$ and $Y_2$ will be obtained using the process outlined above for length L, and the lengths $Y_1$ and $Y_2$ can be used to get the coordinates along the X-axis and the Y-axis, respectively.

The x- and y-components of the coordinates determined using expression (3) above are stored in the first column and second column of the matrix C, respectively. Note that the dimension of the matrix C will be (2Z+3) by 2. The matrix C represents the points on the sample 61 at which birefringence or other optical property will be measured. The grid generation module 64 then computes the radial distance of each coordinate in the matrix C from the origin O of the coordinate system, shown at 84, and determines if the radial distance falls within the measurement aperture 68. Let Cx and Cy represent the data in the first column and second column of the matrix C, respectively. Then the radial distance $R_i$ of a coordinate $Cx_i, Cy_i$, where i corresponds to a row in the matrix C, can be determined as follows:

$$R_i = \sqrt{(Cx_i)^2 + (Cy_i)^2} \quad (4)$$

The radial distances $R_i$ of all the coordinates $Cx_i, Cy_i$ in the matrix C can be obtained by evaluating the expression (4) for all the rows in the matrix C. The results are stored in the vector R. The grid generation module 64 then evaluates the vector R to see if any of the radial distances $R_i$ falls outside of the boundary of the measurement aperture 68. For a circular measurement aperture 68, this can be done simply by checking if $R_i$ is greater than X/2. For non-circular shapes, there are several algorithms available for checking whether a point is within or outside of a boundary. Any radial distance $R_i$ that falls outside of the measurement aperture 68 is removed from the vector R and the corresponding coordinate $Cx_i, Cy_i$ is also removed from the matrix C.

The grid generation module next determines the angular position $\Phi_i$ of each coordinate $Cx_i, Cy_i$ with respect to the positive Y-axis and stores the result in the vector Φ. The angular position $\Phi_i$ is given by:

$$\Phi_i = \tan^{-1}\left(\frac{Cx_i}{Cy_i}\right) \quad (5)$$

Note that $\Phi_i$ is zero when $Cx_i$ and $Cy_i$ are both equal to zero. If $Cy_i$ is zero and $Cx_i$ is positive or negative, then $\Phi_i$ is 90 or 270, respectively. The vector $\Phi$ is sorted in ascending order, and the matrix C and vector R are also sorted so that each angular position $\Phi_i$ corresponds to the correct coordinates $Cx_i, Cy_i$ and radial distance $R_i$. Assuming that the first entry $\Phi_0$ in the vector $\Phi$ corresponds to the angular position of the node 72 at the origin O, then a vector $\Delta\Phi$ of incremental angular positions can be generated using the following expression:

$$\Delta\Phi_i = \Phi_i - \Phi_{i-1} \text{ where } i>0 \qquad (6)$$

The vector $\Delta\Phi$ may be used in place of the vector $\Phi$ to position align nodes with the Y-axis. The vector $\Delta\Phi$ can be sorted in ascending order. If vector $\Delta\Phi$ is used and sorted, any sorting applied to the vector $\Delta\Phi$ should also be applied to corresponding entries in the vector R and the matrix C. The vectors R and $\Phi$ (or $\Delta\Phi$) and the matrix C are stored on an electromagnetic medium 86 (shown in FIG. 4).

Figure 7:
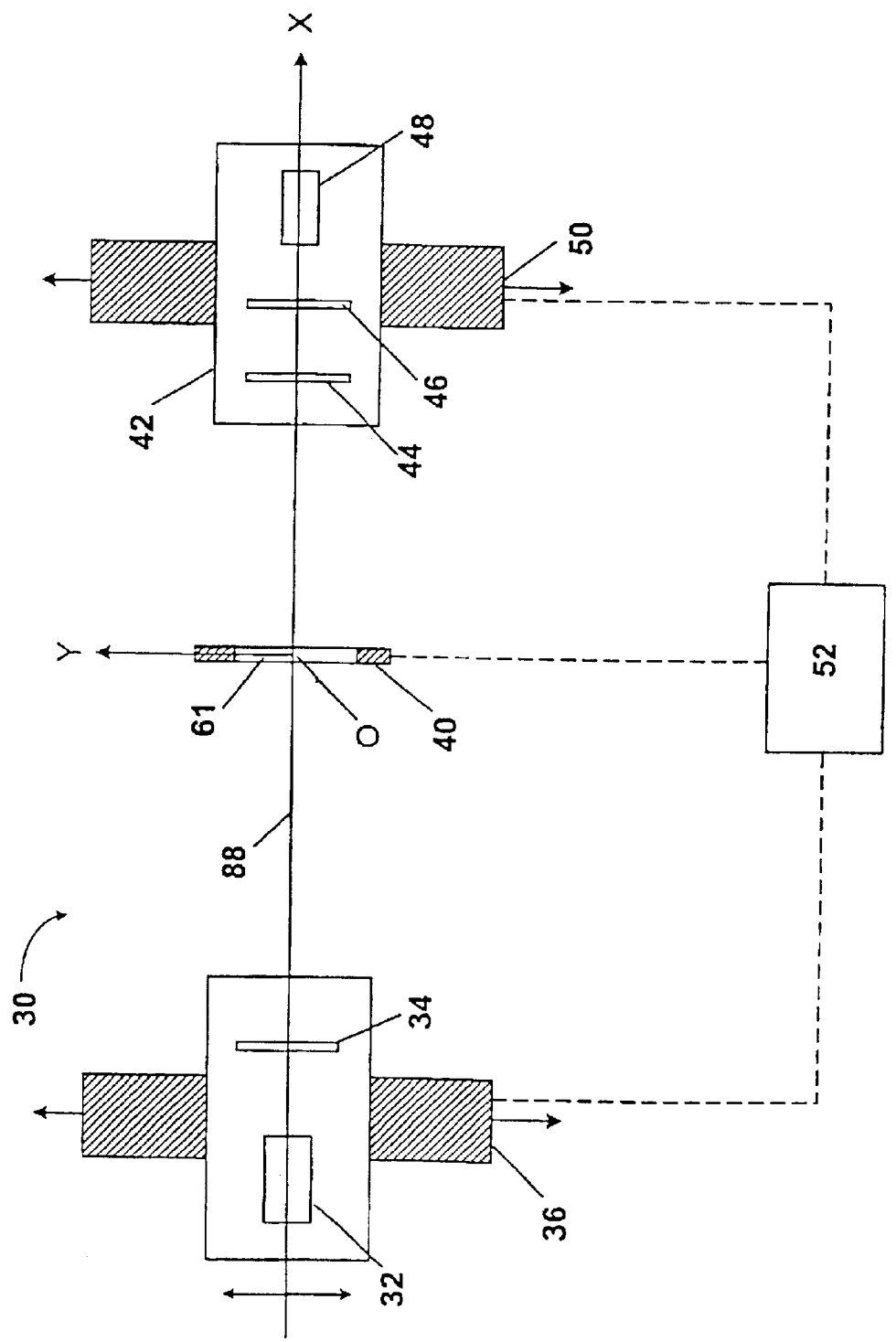
FIG. 7 shows the automated system of FIG. 3 at neutral position.

Referring back to FIG. 4, the process continues by moving the translation stages 36 and 50 and the sample holder 40 to the neutral position 88, shown at 90. FIG. 7 shows the neutral position 88 as a position where the polarizers 34 and 46 are aligned with center of rotation of the sample 61. The process then continues by initializing the index i to 1, shown at 92. The process then continues by starting the measurements. First, a check is performed to determine if i is less than or equal to N, shown at 94. N is the number of rows in the vector R or $\Phi$ or matrix C stored on the electromagnetic medium 86. If i is less than N, shown at 96, the program reads the radial distance $R_i$, i.e., the $i^{th}$ entry in the vector R, and the angular position $\Phi_i$, i.e., the $i^{th}$ entry in the vector $\Phi$. If i is greater than N, shown at 108, the process is terminated.

As shown at 100, the sample holder 40 (shown in FIGS. 3 and 7) is rotated by an angle $\Phi_i$ specified by the vector $\Phi$ so that the point to be measured is aligned with the vertical. For example, to make measurements at the node labeled C in FIG. 5, the sample 61 can be rotated through an angle $\Phi$ so that the node C is aligned with the Y-axis. This assumes that the sample 61 is initially at the neutral position. Alternatively, the program may use the incremental angle $\Delta\Phi_i$ to rotate the node C from its current position to the Y-axis. The vector $R_i$ is used to determine how far along the vertical to move the translational stages 36 and 50 to take the measurements. The process may keep track of the current position of the translational stages 36 and 50 and move the translation stages 36 and 50 in increments or may return the translation stages 36 and 50 to the neutral position and move them in the number of units specified by $R_i$. When the translational stages 36 and 50 and the sample 61 are at the appropriate height and orientation, respectively, the analyzer 46 is rotated to measure birefringence, as shown at 102. The measurements made at 102 are stored in an electromagnetic medium 104.

The next step is to increment i by one, shown at 106, and repeat the steps 94 through 106 in the process until i becomes greater than N, at which point the process is terminated. The measurements stored in the electromagnetic medium 104 can then be accessed and analyzed, and the results of the process can be displayed, shown at 110. Birefringence charts can be plotted as a function of the coordinates stored in the matrix C. However, the user may choose to view the results in real time. In this case, the measurements are analyzed as they are obtained and the results are displayed. The process described above can be readily adapted to measure other optical properties, e.g., transmission. Any modification to the process shown in FIG. 4 will come in step 102, which must be tailored to the desired optical property to be measured. As can be observed from the description above, the process provides an advantage in that a single operator can quickly and accurately create a birefringence map or other optical-property map of a sample.

It should be understood that in the process described above, the origin O of the coordinate system does not have to be at the geometric center of the sample 61. The process will still work if the origin O is offset from the geometric center of the sample 61, but the origin O should remain within the measurement aperture 68 (shown in FIG. 5) of the sample 61. The origin O would generally coincide with the center of rotation of the sample 61. If the center of rotation is different from the geometric center of the sample, this information will be provided to the input module 62 and taken into account when generating the matrix C and the vectors R and O in the grid generation module 64.

For birefringence measurements, it has been found that the sample holder 40 induces some localized stresses at the region where it supports the sample 61. These localized stresses can affect the accuracy of the birefringence measurements. Therefore, measurements are preferably taken at the top half of the sample 61, where the weight of the sample 61 is not bearing on the sample holder 40. This means that even though the grid 70 is symmetrical about the center of rotation of the sample 61, it may be better not to take advantage of the symmetry, but rotate the sample 61 through 360 degrees to take the measurements. The translation stages 36 and 50 would then be moved back and forth between the center and top edge of the sample 61. By the time the sample is rotated through 360 degrees, measurements would have been made at all the appropriate points on the sample. For optical properties that are not sensitive to induced stresses, measurements can be made at both the upper and lower halves of the sample 61.

Figure 8:
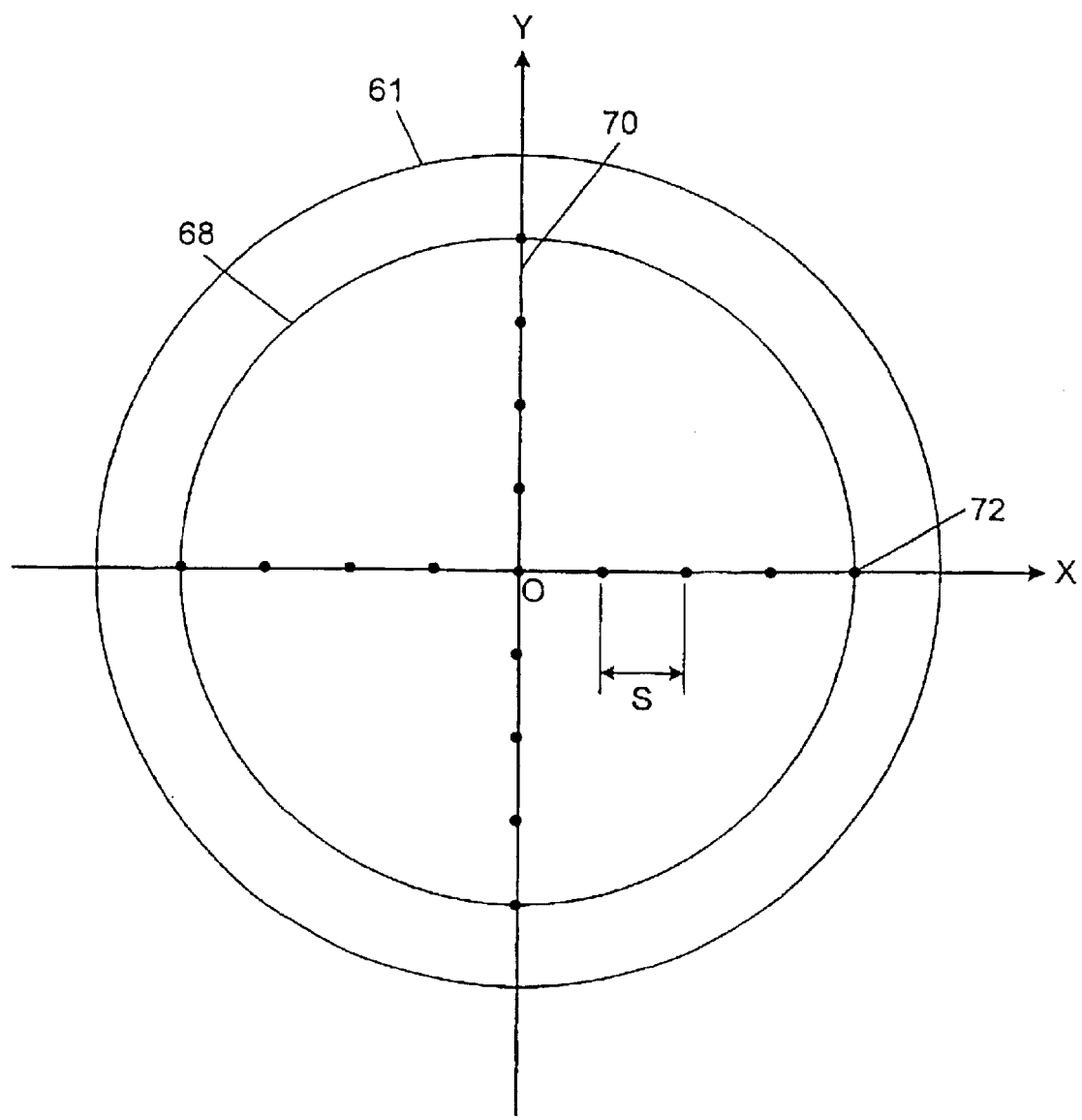
FIG. 8 shows data points sampled along orthogonal axes of a sample.

The process can be adapted to make measurements only about orthogonal axes of the sample 61 only instead of mapping the entire sample 61. In this case, as shown in FIG. 8, the grid 70 would simply be two orthogonal lines on the sample 61 with nodes 72 along the X-axis that are described by expressions:

$$(x,y) = \{(-X/2, 0), (-ZS, 0), (-(Z-1), 0), \ldots (-2S, 0), (-S, 0), (0, 0), (-S, 0), (-2S, 0), \ldots, ((Z-1), 0) (ZS, 0), (X/2, 0)\} \qquad (6)$$

and nodes along the Y-axis that are described by expressions:

$$(x,y) = \{(0, -X/2), (0, -ZS), (0, -(Z-1)), \ldots, (0, -2S), (0, -S), (0, 0), (0, -S), (0, -2S), \ldots, (0, (Z-1)) (0, ZS), (0, X/2)\} \qquad (7)$$

The measurements along the orthogonal lines would then be made using the same process illustrated in FIG. 4.

While the example embodiment described herein is directed to measurement of the birefringence of a sample, it should be clearly understood that the automated system can measure other types of optical properties, e.g., transmission. The process described above can easily be extended to other measurements, simply by changing some of the elements such as the analyzer or light source. It is also possible to perform continuous measurements while keeping spatial resolution constant. Also, the process can be extended to look at any property in which there is an energy source and a detector. Specifically, the process applies to any property that measures the state of the energy entering a sample and compares it to the state of the energy leaving a sample.

Those skilled in the art will appreciate that other embodiments of the invention can be devised which do not depart from the spirit of the invention as disclosed herein. Accordingly, the scope of the invention should be limited only by the attached claims.

What is claimed is:

1. A method for automating measurement of an optical property of a sample, comprising:

selecting a measurement aperture around a reference point on the sample;

generating a set of grid nodes that fall within the measurement aperture;

calculating the radial distance of each node with respect to the reference point;

calculating the angular position of each node with respect to vertical;

moving a light source and a light detector along the vertical and rotating the sample to measurement positions in which the light source and the light detector are aligned with one of the nodes in the measurement aperture, wherein the calculated radial distances and angular positions are used to control positioning of the light source and the light detector and rotation of the sample; and measuring the optical property at the measurement position by energizing the light source and interrogating the detector.

2. The method of claim 1, wherein selecting a measurement aperture comprises obtaining information about the geometry of the sample.

3. The method of claim 2, wherein the information is a length of the sample.

4. The method of claim 1, wherein generating a set of grid nodes further comprises obtaining a desired spacing between the grid nodes.

5. The method of claim 1, wherein the reference point is coincident with the geometric center of the sample.

6. The method of claim 1, wherein the reference point is coincident with a center of rotation of the sample.

7. The method of claim 1, further comprising discarding grid nodes having radial distances outside of the measurement aperture.

8. The method of claim 1, wherein the coordinates of the grid nodes, the radial distances of the nodes with respect to the reference point, and the angular positions of the nodes with respect to the vertical are stored on an electromagnetic medium, and wherein the tables are sorted such that the angular positions are in sequential order.

9. The method of claim 8 further comprising calculating incremental angular positions from the table of angular positions and storing the incremental angular positions in a table.

10. The method of claim 9, wherein the sample is rotated incrementally using the incremental angular positions.

11. The method of claim 1, wherein the optical property measured is birefringence and measurements are restricted to the upper portion of the sample as the sample is rotated to the measurement positions.

12. The method of claim 1 wherein the light source and the light detector are initially moved along the vertical such that the light source and the light detector are aligned with the reference point on the sample.

13. A computer readable storage medium containing an executable program for use in automating measurement of an optical property, the executable program comprising instructions that when executed by a computer enable the computer to:

select a measurement aperture around a reference point on the sample;

generate a set of grid nodes that fall within the measurement aperture;

calculate the radial distance of each node with respect to the reference point;

calculate the angular position of each node with respect to the vertical;

generate signals to move a light source and a light detector along the vertical and to rotate the sample to measurement positions in which the light source and the light detector are aligned with one of the nodes in the measurement aperture, wherein the signals are generated in accordance with the calculated radial distances and angular positions; and record measurements made at the measurement positions.

14. The program of claim 13, wherein the computer presents an input module that allows information about the geometry of the sample to be entered and selects the measurement aperture based on the information entered in the input module.

15. The program of claim 13, wherein the computer presents an input module that allows the desired spacing between the grid nodes to be entered.

16. The method of claim 14, wherein the computer discards the grid nodes having radial distances that fall outside of the measurement aperture.

17. The method of claim 13, wherein the computer analyzes the recorded measurements and displays the results.

* * * * *